(12) United States Patent
Iida et al.

(10) Patent No.: US 7,632,628 B2
(45) Date of Patent: Dec. 15, 2009

(54) STAMPER AND METHOD FOR PRODUCTION THEREOF

(75) Inventors: Tetsuya Iida, Tsurugashima (JP); Masahiro Katsumura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 768 days.

(21) Appl. No.: 10/553,176

(22) PCT Filed: Apr. 7, 2004

(86) PCT No.: PCT/JP2004/005015

§ 371 (c)(1),
(2), (4) Date: Oct. 13, 2005

(87) PCT Pub. No.: WO2004/095445

PCT Pub. Date: Nov. 4, 2004

(65) Prior Publication Data

US 2006/0187804 A1    Aug. 24, 2006

(30) Foreign Application Priority Data

Apr. 18, 2003    (JP)    ............... 2003-114684

(51) Int. Cl.
G11B 7/26    (2006.01)
B29C 45/26    (2006.01)
B29L 17/00    (2006.01)
(52) U.S. Cl. .................. 430/321; 430/320; 101/28
(58) Field of Classification Search .................. None
See application file for complete search history.

(56) References Cited

U.S. PATENT DOCUMENTS

| 4,211,617 | A  | * | 7/1980  | Hunyar ................... 205/68 |
| 5,310,333 | A  | * | 5/1994  | Sato et al. ............... 425/363 |
| 6,207,247 | B1 | * | 3/2001  | Morita ................... 428/64.1 |
| 2001/0050444 | A1 | * | 12/2001 | Katsumura et al. ........ 264/1.33 |
| 2001/0053122 | A1 | * | 12/2001 | Yukumoto et al. ......... 369/286 |
| 2002/0150840 | A1 | * | 10/2002 | Katsumura et al. ........ 430/320 |
| 2002/0153625 | A1 | * | 10/2002 | Katsumura et al. ........ 264/1.36 |

FOREIGN PATENT DOCUMENTS

| JP | 57-082236 | * | 5/1982 |
| JP | 60-174891 | * | 9/1985 |
| JP | 61-077152 | * | 4/1986 |
| JP | 03-247788 | * | 11/1991 |
| JP | 04-238130 | * | 8/1992 |

\* cited by examiner

Primary Examiner—Martin J Angebrannt
(74) Attorney, Agent, or Firm—Drinker Biddle & Reath LLP

(57) ABSTRACT

The present invention relates to a stamper used for an injection molding of a resin material and a manufacturing method thereof. It is provided with such stamper as being excellent in durability in use without causing corrosion at a portion contacting with the resin material, wherein an anti-corrosion film made of any one of alloy selected from a nickel alloy, a silver alloy or a copper alloy is formed on a surface of the stamper contacting with the resin material. Further, it is provided with a method comprising steps of: forming anti-corrosion film on the surface of a mold for manufacturing the stamper; forming the stamper on the anti-corrosion film; and separating the stamper and the anti-corrosion film in a body from the mold.

3 Claims, 5 Drawing Sheets (SPATTERING, VACUUM VAPOR DEPOSITION, CVD)

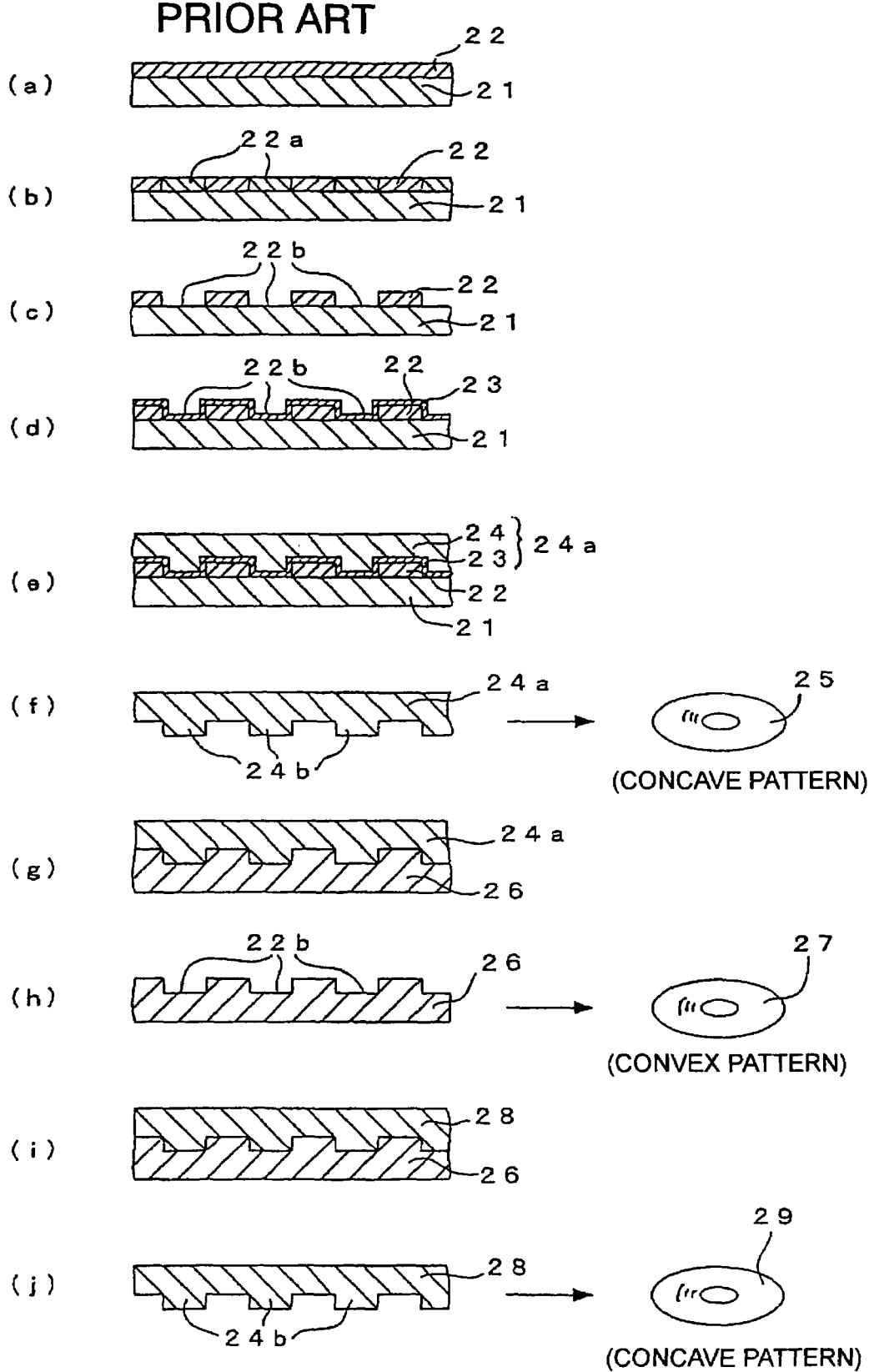

STAMPER AND METHOD FOR PRODUCTION THEREOF

TECHNICAL FIELD

The present invention relates to a stamper used for an injection molding using a resin material and a method for manufacturing the stamper.

BACKGROUND ART

A stamper has ever been used for reproducing a large amount of an optical disk represented by CD (Compact Disc), DVD (Digital Versatile Disc) and the like. There is formed on the surface of the stamper convex-concave pattern corresponding to pits and grooves to be formed on the optical disk, such as CD, DVD and the like. An optical disk substrate having same convex-concave pattern can be mass produced by an injection molding of a resin material as a substrate for the optical disk onto said convex-concave pattern of the stamper.

As for a material for forming above-mentioned stamper, nickel, copper and silver have been used due to good molding performance thereof.

However, in case that a large amount of the optical disk substrate was reproduced by using the stamper made of material such as nickel and the like, such problem sometimes occurred that a part of the stamper contacting with the resin material (this part of the stamper is hereinafter called "stamper surface" in some cases) was subject to corrosion according to chlorine component and the like contained in the resin material used for the optical disk substrate, and therefore, the correct reproduction of prescribed pits could not be achieved precisely along with a progress of the corrosion after repeating the reproduction many times.

In particular, when a polycarbonate resin was used as the resin material for the optical disk substrate because it was relatively cheap, the problem became more serious since in some cases a large amount of chlorine component was contained as an impurity in said resin material.

The present invention has been made with consideration of these problems. One of the objectives to be achieved by the invention is to provide with a stamper having excellent durability in use without causing corrosion on a part of the stamper contacting with a resin material even when a large amount of an optical disk substrate is reproduced, and also, to provide with a method by which the stamper can be manufactured efficiently.

DISCLOSURE OF THE INVENTION

In order to solve the above-mentioned problems, the present invention provides with a stamper used in an injection molding using a resin material, characterized in that an anti-corrosion film made of any one of alloy selected from the group consisting of a nickel (Ni) alloy, a silver (Ag) alloy and a copper (Cu) alloy, is formed on the surface of the stamper which contacts with the resin material.

And also, the present invention provides with a method for manufacturing the stamper used in the injection molding using the resin material, characterized in that said method comprises steps of: using a mold for manufacturing the stamper on which convex shape corresponding to concave shape to be formed on the surface of the stamper contacting with the resin material, are formed, or inversely, concave shape corresponding convex shape to be formed on the stamper surface are formed; forming an anti-corrosion film made of any one of alloy selected from the group consisting of a nickel (Ni) alloy, a silver (Ag) alloy and a copper (Cu) alloy on the surface of the mold on which the above-mentioned convex shape or concave shape are formed; laminating a metal layer on said anti-corrosion film by mean of an electroplating method; and subsequently separating both said laminated metal layer and the anti-corrosion film from the mold for manufacturing the stamper at the same time.

BRIEF DESCRIPTION OF THE DRAWINGS

FIG. 5 is a process flow diagram for explaining an electroplating method as one of the method for manufacturing the stamper main body.

EMBODIMENT OF THE INVENTION

Figure 1A:
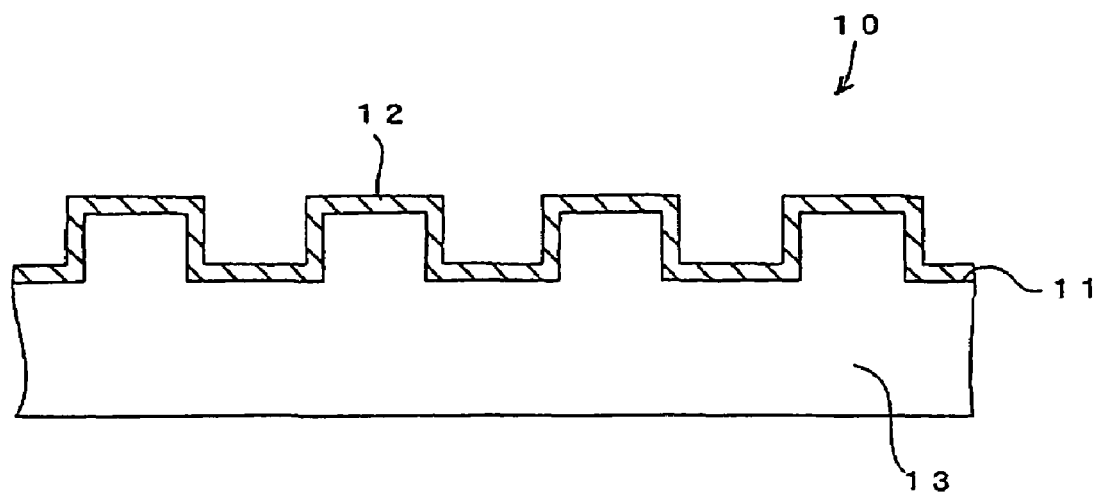
FIG. 1A and FIG. 1B are cross sectional drawings of the stamper according to the present invention.

In the following, the stamper and the manufacturing method thereof according to the present invention will be explained in detail with reference to the drawings. In the first place, the typical method for manufacturing the stamper main body 13 (namely, a conventional stamper) will be explained with reference to FIG. 5.

FIG. 5 is a process flow diagram for explaining an electroplating method as one of the method for manufacturing the stamper main body 13.

As shown in FIG. 5 (*a*), a resist film 22 is first formed by mean of a spin coating method or the like on a surface of substrate 21 made of a glass (or a silicon resin), of which the surface is made plain by polishing.

And then, a patterning treatment is carried out to said resist film 22. The patterning treatment is carried out, as shown in FIG. 5 (*b*), in such way that the resist film 22 is subject to light exposure with laser beam (or electron beam) to form a latent FIG. 22*a*, followed by development thereof. According to this, a concave pattern 22*b* comprising plurality of grooves is formed on the surface of the resist film 22, as shown in FIG. 5 (*c*).

After carrying out the patterning treatment, an electrode film 23 made of a metallic material is formed on the resist film 22 by mean of a spattering method, a vapor deposition method and the like so as to cover the entire area of the concave pattern 22*b*, as shown in FIG. 5 (*d*). As the metallic material for the electrode film 23, nickel, silver or copper having properties of high electric conductivity and of good chemical stability so that the change of composition after the film forming may be difficult to occur, is used as a simple metal and the thickness of the film is uniform.

After that, a metal layer 24 is laminated on the surface of the electrode film 23 by mean of an electroplating method using the electrode film 23 itself as an electrode, as shown in FIG. 5 (*e*). It is noted that as the metal layer 24, the same material used for the electrode film 23 may be used in general. Specifically, when nickel metal is used for the electrode film 23, nickel is used for the metal layer 24, and also when silver metal is used for the electrode film 23, silver is used for the metal layer 24 as well as when copper metal is used for the electrode film 23, copper is used for the metal layer 24, respectively. However, a different material may be used, as well.

Subsequently, as shown in FIG. 5(f), the stamper 24a having the electrode film 23 and the metal layer 24 in one body can be obtained by separating the metal layer 24 together with the electrode film 23 from the surface of the resist film 22. (This stamper 24a may be called "Master Stamper" in some cases since it constitutes a basic stamper for reproduction of other stampers that will be carried out thereafter.) On the surface of this stamper 24a, a crest (convex) pattern 24b comprising plurality of projections is transcribed in such manner that it is formed as reversed shape to the afore-mentioned concave pattern 22b. (Namely, this stamper 24a is a convex shape stamper having crests.) Accordingly, by using this stamper 24a as a mold and conducting an injection molding of a resin material for an optical disk substrate onto the surface of the stamper on which the convex pattern 24b is formed, such substrate having the same concave pattern (comprising pits and grooves of concave shape) as the concave pattern 22b transcribed on the surface thereof is formed. And then, an optical disk 25 can be manufactured by laminating a refractive layer, a protective layer and the like on the substrate in order to cover said concave pattern.

It is also possible that as shown in FIG. 5 (g), after carrying out passivation treatment (treatment for making a passive state) on the surface of the stamper 24a of convex shape, a metal layer 26 can be laminated again by an electroplating method using said stamper 24a as an electrode, and then said metal layer 26 is peeled out of the stamper 24a as shown in FIG. 5 (h), a stamper 26 having the same concave pattern as the concave pattern 22b transcribed thereon can be obtained. (This stamper 26 may be called "Sub-master Stamper" in some cases.)

Since the same concave pattern as the afore-mentioned concave pattern 22b is transcribed on the surface of said stamper 26 (namely, this stamper 26 is a concave shape stamper), such substrate having the same convex pattern (comprising pits and grooves of convex shape) as the afore-mentioned convex pattern 24a transcribed on the surface thereof by using this stamper 26 as a mold and conducting an injection molding of a resin material for an optical disk substrate. And then, an optical disk 27 can be manufactured by laminating a refractive layer, a protective layer and the like on the substrate in order to cover said convex pattern.

Furthermore, it is also possible that as shown in FIG. 5 (i), after carrying out passivation treatment (treatment for making passive state) on the surface of the stamper 26 of concave shape, a metal layer 28 can be laminated once again by an electroplating method using said stamper 26 as an electrode, and then said metal layer 28 is peeled out of the stamper 26 as shown in FIG. 5 (j), a stamper 28 having the same pattern as the stamper 24a shown in FIG. 5 (f) (namely, Master Stamper) can be obtained. (This stamper 28 may be called "Baby Stamper" in some cases.) Since the stamper 28 has the same pattern as the stamper 24a, by using this stamper 28 as a mold and conducting an injection molding of a resin material for an optical disk substrate on a surface of the stamper 28 on which the convex pattern 24b is formed, such substrate having the same concave pattern (comprising concave pits and grooves) as the concave pattern 22b transcribed on the surface thereof, is formed and an optical disk 29 can be manufactured by laminating a refractive layer, a protective layer and the like on the substrate in order to cover the concave pattern.

As described in the foregoing, it is possible to manufacture plurality of stampers (28) having the same pattern and shape, and by repeating the reproduction works using plurality of stampers (28) at the same time, it is possible to manufacture a large amount of an optical desk in a time.

Such stampers 24a, 26 and 28 as manufactured by an electroplating method and the like as shown in FIG. 5 are used as a main body (refer to reference numeral 13 in FIG. 1) of the stamper according to the present invention, and the stamper 10 of the present invention can be manufactured by forming anti-corrosion film 12 comprising a nickel alloy and the like on the surface thereof.

Figure 1B:
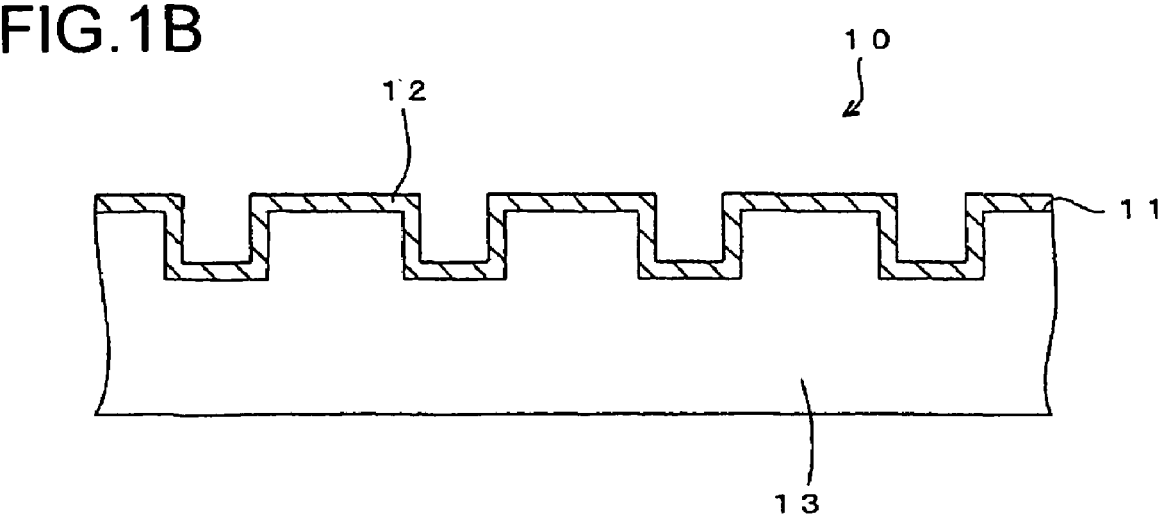

FIG. 1A and FIG. 1B are both cross sectional drawings of the stamper 10 according to the present invention. FIG. 1A shows a convex shape stamper (namely, a stamper for forming pits and grooves of concave shape on an optical disk), and FIG. 1B shows a concave shape stamper (namely, a stamper for forming pits and grooves of convex shape on an optical disk). Thus, the stamper 10 according to the present invention can be made as a convex shape or alternatively, a concave shape depending on the shape of the pits of an optical disk to be reproduced.

The stamper 10 according to the present invention has such characteristic feature that an anti-corrosion film 12 made of any one of alloy selected from a nickel (Ni) alloy, a silver (Ag) alloy or a copper (Cu) alloy is formed on such surface 11 that is the surface contacting with a resin material used for an optical disk substrate when the optical disk substrates are reproduced by an injection molding (and the surface forming thereon a convex shape including pits and grooves (in case of FIG. 1A) or a concave shape (in case of FIG. 1B)).

By forming said anti-corrosion film 12 made of the above-mentioned alloy, it is possible to avoid from causing corrosion on the surface 11 of the stamper even when the optical disk substrate is reproduced by an injection molding of polycarbonate resin containing chlorine component therein, for example, on the surface 11 of the stamper, and therefore, it is possible to reproduce a large amount of the optical disk substrate having a prescribed pits thereon.

As anti-corrosion film 12 in the stamper 10 according to the present invention, any alloy selected from the afore-mentioned three kinds of alloy (a nickel alloy, a silver alloy or a copper alloy) may be used. However, when a large amount of the optical disk substrate is reproduced, close adhering of the anti-corrosion film 12 to the main body 13 of the stamper 10 becomes important factor. Taking such close adhering into consideration, it is desirable that a material for the main body 13 of the stamper should be consistence with the main component of the alloy forming the anti-corrosion film 12.

More specifically, when nickel (Ni) is used for the main body 13 of the stamper, it is preferable that a nickel alloy is used for the anti-corrosion film 12. On the other hand, when the material of the main body 13 of the stamper is silver (Ag), it is preferable that a silver alloy is used for the anti-corrosion film 12, and also when the material of the main body 13 of the stamper is copper (Cu), a copper alloy is used for the anti-corrosion film 12, respectively.

Incidentally, forming the main body 13 of the stamper by nickel, silver or copper is preferable also from a point of view using an electroplating method, which is a conventional method for manufacturing a stamper. (A method for manufacturing of a stamper will be explained later in detail.)

Further, when a nickel alloy is used as the anti-corrosion film 12, it is preferable to use such a nickel alloy wherein nickel (Ni) is used as the main component of the alloy and one element or two or more elements selected from the group consisting of ruthenium (Ru), copper (Cu), phosphorus (P), magnesium (Mg), chromium (Cr), gold (Au), silicon (Si), titanium (Ti) and silver (Ag) is added thereto. In case of adding ruthenium, copper, phosphorus, magnesium, chrome, gold and/or silicone, an amount of these elements to be added is preferable to be not more than 25 weight % with respect to the total amount. In case of adding titanium and/or silver, an amount of these elements to be added is preferable to be not more than 50 weight % with respect to the total amount. There is not always the lower limit in the addition amount thereof, but it is preferable to be more than 1 weight % with respect to the total amount.

Further, when a silver alloy is used as the anti-corrosion film 12, it is preferable to use silver (Ag) as the main component of the alloy and at least one of gold (Au) or copper (Cu) in addition thereto. The addition amount of these elements is preferable to be from 1.0 weight % or more to 5.0 weight % or less with respect to the total amount.

Still further, when a copper alloy is used as the anti-corrosion film 12, it is preferable to use copper (Cu) as the main component of the alloy and at least one of silver (Ag) or titanium (Ti) in addition thereto. The addition amount of these elements is preferable to be from 1.0 weight % or more to 10.0 weight % or less with respect to the total amount in case of addition of silver and to be from 1.0 weight % or more to 5.0 weight % or less with respect to the total amount in case of addition of titanium.

By using these alloys containing such elements and in such amount as described above for the anti-corrosion film 12, it is possible to increase the durability in use of the stamper 10.

A thickness of the above-described anti-corrosion film 12 is not particularly limited as long as it can perform the above-described effect namely, such effect that corrosion will not occur by a resin material used for an optical disk substrate). Usually, the thickness can optionally be set according to frequency in using of the stamper (specifically, how many optical disk may be reproduced by using said stamper) and the like. For example, the above-described effect can surely be achieved by the thickness of about 30-200 μm, preferably, 30-100 μm.

[Manufacturing Method 1]

Figure 2A:
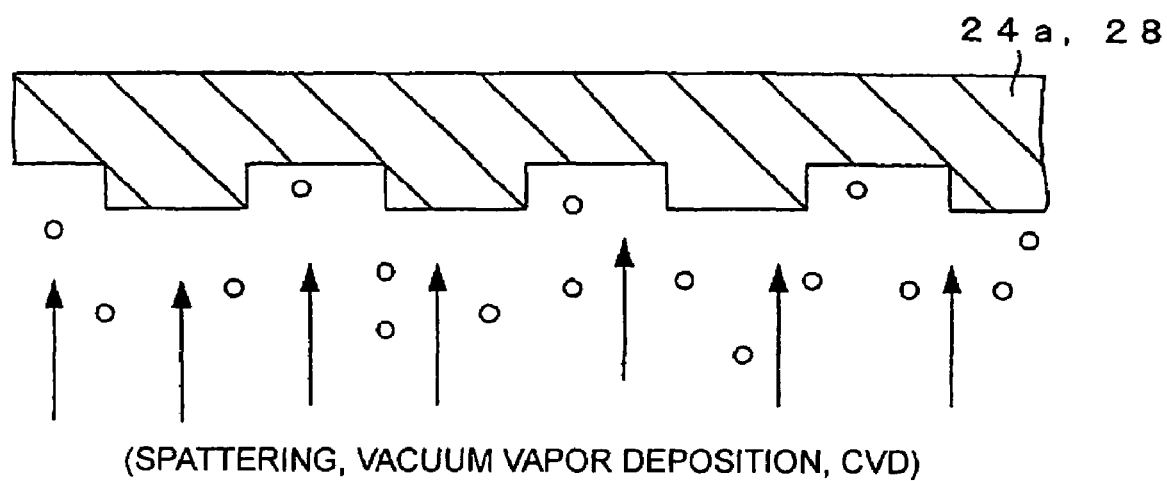
FIG. 2A and FIG. 2B are process flow diagrams for explaining the method for manufacturing the stamper according to the present invention.
Figure 2B:
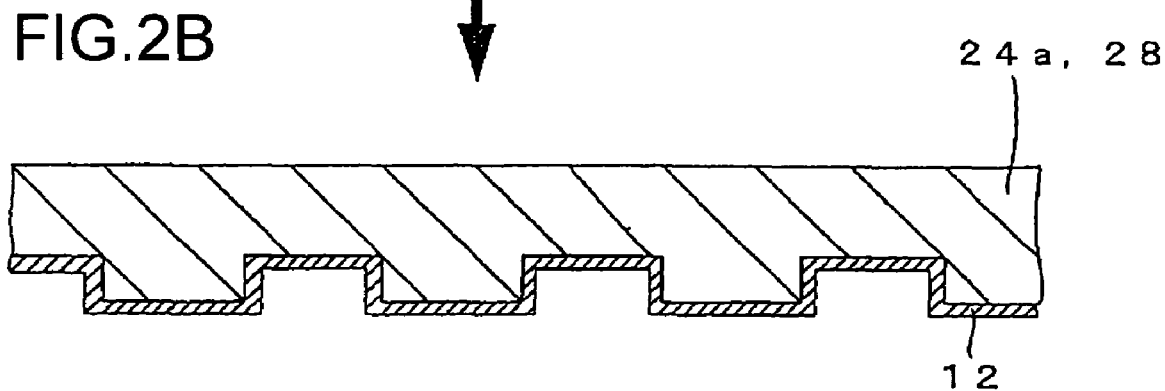

FIG. 2A and FIG. 2B are process flow diagrams for explaining a method for manufacturing the stamper according to the present invention.

As shown in FIG. 2A, the anti-corrosion film 12 may be formed directly on the surface of the stamper 24a or 28 manufactured by the method as shown in FIG. 5 (the surface that concave or convex shape is formed thereon and a resin material contacts therewith) by a conventional method such as a spattering method, a vacuum vapor deposition method, chemical vapor deposition method (CVD) and the like, as shown in FIG. 2B. It is noted that in FIG. 2A and FIG. 2B, an example is shown for a stamper of convex shape, it is also applied to a stamper of concave shape (stamper 26 shown in FIG. 5, for example).

According to this method, the method for forming the anti-corrosion film 12 is a conventional one that is used also for forming an electrode film 23, as shown in FIG. 5, as well. Therefore, it is not necessary particularly to prepare the equipment newly for that purpose and thus it is possible to carry out easily and conveniently.

However, there are some cases that when the anti-corrosion film 12 is formed by mean of one of these methods, since the anti-corrosion film 12 is formed so that it may cover the convex shape (or concave shape) formed on the stamper and the surface of the anti-corrosion film 12 itself becomes the face contacting with the resin material, the shape of the pit to be transferred onto the optical disk may be distorted if the shape of the surface of the anti-corrosion film 12 may not be the correct convex shape (or concave shape).

[Manufacturing Method 2]

Figure 3:
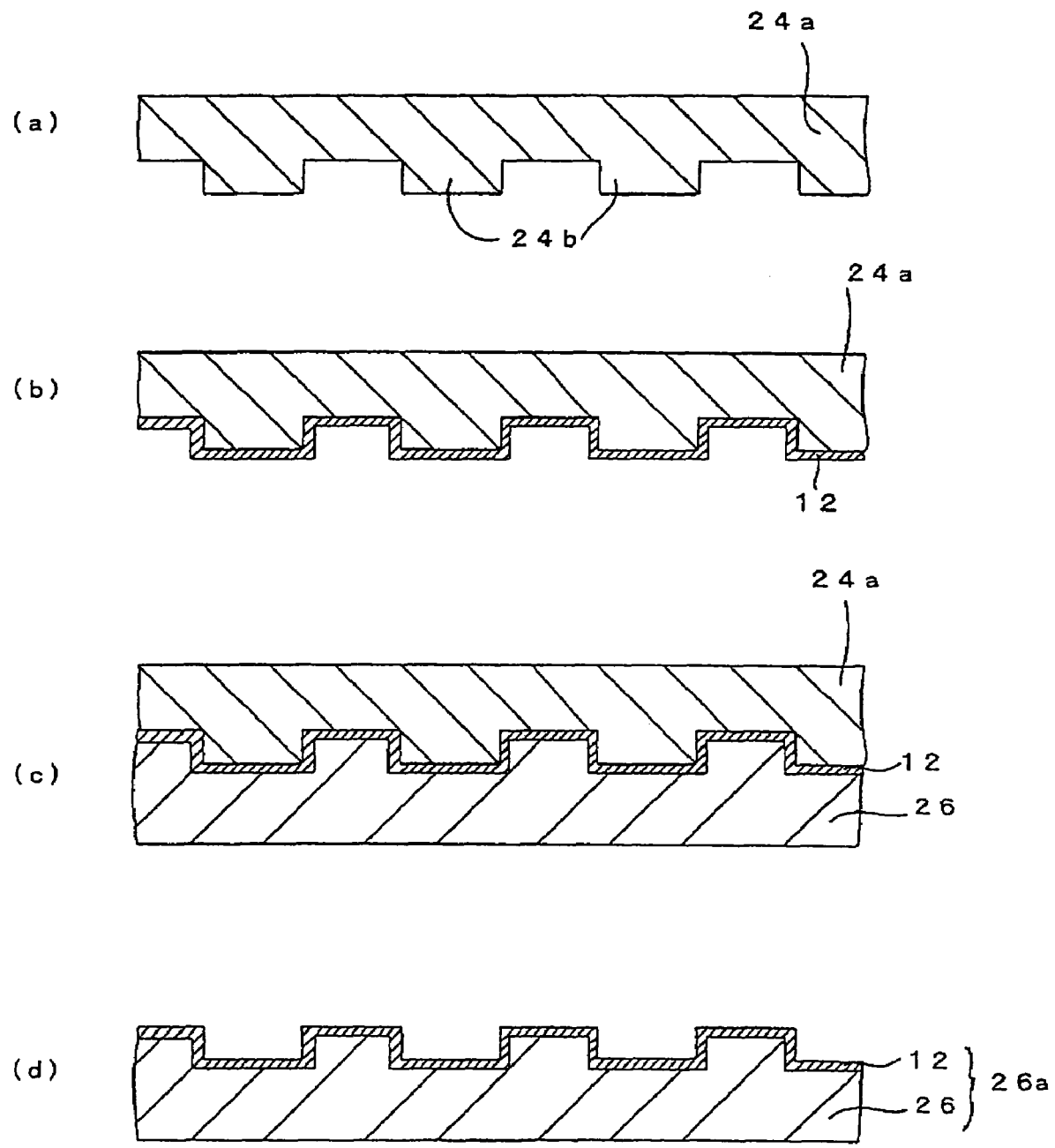
FIG. 3 is another process flow diagram other than that shown in FIG. 2 for explaining the method for manufacturing the stamper according to the present invention.

FIG. 3 is another process flow diagram other than Manufacturing Method 1 for explaining a method for manufacturing the stamper according to the present invention, and specifically, it shows a method for forming the anti-corrosion film 12 on the surface of stamper 26 (that is to say, "Sub-master Stamper") shown in FIG. 5.

In the first place as shown in FIG. 3 (*a*), a mold for manufacturing a stamper (Master Stamper 24a shown in FIG. 5) is used, on which it is formed convex shape (convex pattern 24b shown in FIG. 5) corresponding to concave shape (concave pattern 22b shown in FIG. 5) to be formed on the surface of the stamper 26 (Sub-master Stamper) that contacts with a resin material.

Next, after carrying out passivation treatment on the surface of the stamper 24a of convex shape, the anti-corrosion film (12) made of any one of alloy selected from a nickel alloy, a silver alloy or a copper alloy is formed, as shown in FIG. 3 (*b*), on the surface of the mold for manufacturing stamper (Master Stamper 24a) on which the afore-mentioned convex shape (convex pattern 24b) is formed. Any conventional method (for example, a spattering method, a vacuum vapor deposition method, chemical vapor deposition method, and the like) can be used for a method for forming the anti-corrosion film 12. Subsequently, as shown in FIG. 3 (*c*), a metal layer 26 is laminated on the anti-corrosion film (12) by an electroplating method.

Then, as shown in FIG. 3 (*d*), the sub-master stamper 26a having the anti-corrosion film 12 on the surface thereof according to the present invention can be obtained by separating the metal layer 26 laminated on the anti-corrosion film 12 together with the anti-corrosion film 12 itself from the stamper manufacturing mold 24a.

Figure 4:
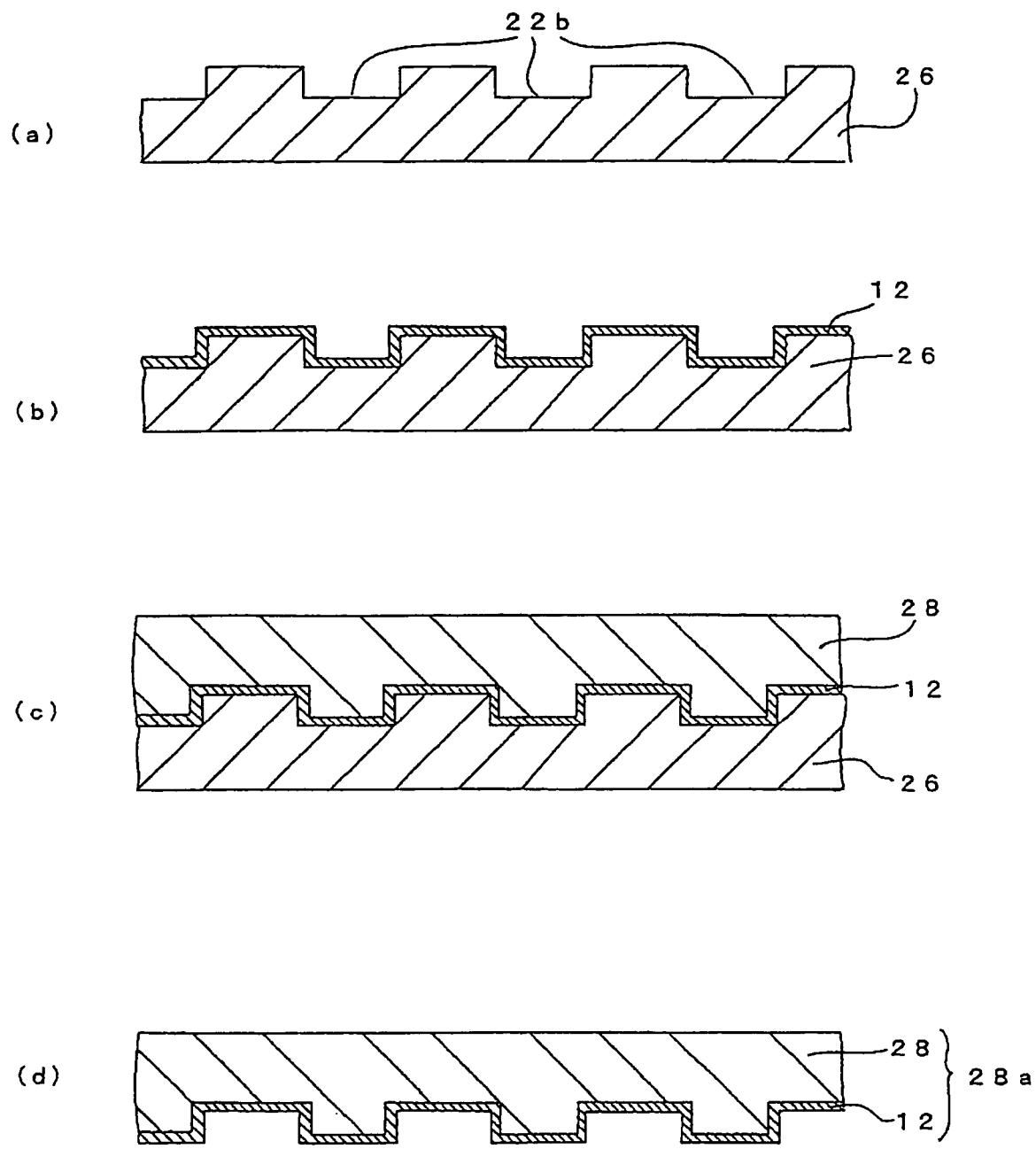
FIG. 4 is still another process flow diagram other than that shown in FIG. 2 for explaining the method for manufacturing the stamper according to the present invention.

FIG. 4 is a process flow diagram illustrating a method for forming the anti-corrosion film 12 on the surface of the stamper 28 shown in FIG. 5 (that is to say, "Baby Stamper"). In this case, similar method as shown in FIG. 3, using a mold for manufacturing stamper (stamper 26 shown in FIG. 5 (Sub-master Stamper)) for manufacturing the stamper 28 can also be used.

Namely, in the first place as shown in FIG. 4(*a*), it is used a mold for manufacturing stamper (Sub-master Stamper 26 shown in FIG. 5), on which it is formed concave shape (concave pattern 22b shown in FIG. 5) corresponding to convex shape (convex pattern 24b shown in FIG. 5) to be formed on the surface of the stamper 28 (Baby Stamper) that contacts with a resin material.

Next, after carrying out passivation treatment on the surface of the stamper 26 of concave shape, the anti-corrosion film 12 made of any one of alloy selected from a nickel alloy, a silver alloy or a copper alloy is formed as shown in FIG. 4 (*d*), on the surface of the stamper manufacturing mold 26 on which the concave shape (concave pattern 22b) is formed. Any conventional method (for example, a spattering method, a vacuum vapor deposition method, chemical vapor deposition method, and the like) can be used for a method for forming the anti-corrosion film 12. Subsequently, as shown in FIG. 4 (*c*), a metal layer 28 is laminated on the anti-corrosion film (12) by an electroplating method.

As shown in FIG. 4 (*d*), by removing the metal layer 28 laminated on the anti-corrosion film 12 together with the anti-corrosion film 12 itself from the stamper manufacturing mold 26, the stamper 28a having the anti-corrosion film 12 on the surface thereof according to the present invention can be obtained.

As explained in the foregoing, said method is not a method for forming an anti-corrosion film directly on the stamper on which the anti-corrosion film is to be formed, but is characterized in that the method comprises forming anti-corrosion film on the surface of the stamper manufacturing mold necessary for manufacturing the stamper in advance; forming a metal layer (this being the main body of the stamper) on the anti-corrosion film by an electroplating method; and then separating the metal layer together with the anti-corrosion film at the same time to obtain the stamper attached with the anti-corrosion film thereon. According to the method, the stamper of this invention can be manufactured by utilizing a conventional electroplating method. And, being different from that of manufactured by the afore-mentioned [Manufacturing Method 1], the surface of the anti-corrosion film 12 is that formed by separating from the surface of the stamper manufacturing mold 24a. As a result, the concave shape thereof is very sharp that enables to produce such convex shape (pits) to be transferred onto the optical disk substrate from the stamper that is not distorted.

Incidentally, although it is not illustrated by a drawing, the anti-corrosion film can be formed also by using the above-mentioned Manufacturing Method 2 with respect to the stamper 24a (that is to say, Master Stamper) shown in FIG. 5. In this case, a nickel alloy, a silver alloy or a copper alloy performing such function as anti-corrosion film may be used as an electrode film 23.

EXAMPLE

In accordance with the above mentioned Manufacturing Method 2, after carrying out passivation treatment on the surface of the stamper of convex shape (FIG. 3, 24a) as the substrate, the anti-corrosion film (FIG. 3, 12) was formed thereon by using variety kinds of alloy by mean of a conventional chemical vapor deposition method.

Subsequently, a metal layer (FIG. 3, 26) was laminated on said anti-corrosion film using the alloy made of the same material as the anti-corrosion film by mean of a conventional electroplating method. The sub-master stamper (FIG. 3, 26a) attached with the anti-corrosion film (12) on the surface thereof was obtained by separating the metal layer (26) together with the anti-corrosion film (12) at the same time from the stamper (FIG. 3, 24a) as the substrate.

A kind of alloy to form the anti-corrosion film and the metal layer are shown in Table 1. It is noted that the anti-corrosion activity was a result of the measurement by visual inspection regarding change of the state of the surface after dipping the stamper into 5% aqueous solution of salt for 96 hours at the room temperature. "O" means that any change was not observed on the surface and "Δ" means that corrosion was not observed but a little blackening change was observed at the edge.

TABLE 1

| No. | Alloy | Added Elements | Added Amount (Wt. %) | Anti-Corrosion Activity |
|---|---|---|---|---|
| 1 | Ni Alloy | Ru | 1 | O |
| 2 | " | " | 10 | O |
| 3 | " | " | 15 | O |
| 4 | " | " | 20 | Δ |
| 5 | " | Cu | 1 | O |
| 6 | " | " | 10 | O |
| 7 | " | " | 15 | O |
| 8 | " | " | 20 | Δ |
| 9 | " | P | 1 | O |
| 10 | " | " | 10 | O |
| 11 | " | " | 15 | O |
| 12 | " | " | 20 | Δ |
| 13 | " | Mg | 1 | O |
| 14 | " | " | 10 | O |
| 15 | " | " | 25 | O |
| 16 | " | Cr | 1 | O |
| 17 | " | " | 10 | O |
| 18 | " | " | 20 | O |
| 19 | " | " | 25 | Δ |
| 20 | " | Au | 1 | O |
| 21 | " | " | 10 | O |
| 22 | " | " | 25 | O |
| 23 | " | Si | 1 | O |
| 24 | " | " | 10 | O |
| 25 | " | " | 20 | O |
| 26 | " | " | 25 | Δ |
| 27 | " | Ti | 1 | O |
| 28 | " | " | 10 | O |
| 29 | " | " | 25 | O |
| 30 | " | " | 50 | O |
| 31 | " | Ag | 1 | O |
| 32 | " | " | 10 | O |
| 33 | " | " | 25 | O |
| 34 | " | " | 50 | O |
| 35 | Ag Alloy | Au | 1 | O |
| 36 | " | " | 5 | O |
| 37 | " | Cu | 1 | O |
| 38 | " | " | 5 | O |
| 39 | Cu Alloy | Ag | 1 | O |
| 40 | " | " | 5 | O |
| 41 | " | " | 10 | O |
| 42 | " | Ti | 1 | O |
| 43 | " | " | 5 | O |

As explained in the foregoing, since in the stamper 24a and the like according to the present invention, an anti-corrosion film made of one of the alloy selected from a nickel alloy, a silver alloy or a copper ally is formed on the surface contacting with a resin material as an optical disk substrate, a durability in use of the stamper can be increased while keeping the shape of the pit to be reproduced on the optical disk to be accurate.

When a nickel alloy is used as a material for forming the stamper, durability against corrosion can be increased since one or more element selected from ruthenium, copper, phosphorus, magnesium, chrome, gold, silicone, titanium or silver is added into the nickel alloy.

Further, when a silver alloy is used as a material for forming the stamper, durability against corrosion can be increased since at least one element of gold or copper is added into the silver alloy.

Still further, when a copper alloy is used as a material for forming the stamper, durability against corrosion can be increased since at least one element of silver or titanium is added into the copper alloy.

According to the method for manufacturing the stamper of the present invention, said method comprises using a stamper manufacturing mold in which such shape and pattern are formed as corresponding to pits and the like to be formed on the surface contacting with a resin material for the stamper; forming an anti-corrosion film 12 made of one of the alloy selected from a nickel alloy, a silver alloy or a copper ally on the surface of the stamper manufacturing mold, on which said convex shape is formed; laminating a metal layer on the anti-corrosion film 12 by mean of an electroplating method; and then separating the metal layer laminated on the anti-corrosion film 12 together with the anti-corrosion film itself from the stamper manufacturing mold. As a result, the stamper 24*a* and the like accordingly to the present invention can be manufactured without using newly designed specific equipment and the like.

It is noted that although formation of an optical disk substrate is mentioned in the above-mentioned embodiment, the present invention is not limited thereto but can be applied to formation of a mold for manufacturing a fine pattern in an article such as an optical memory substrate, a hard disk substrate, an object lens, and the like.

What is claimed is:

1. A method for manufacturing a stamper used in an injection molding of a substrate out of a resin material, said method comprises steps of:
    providing a metallic mold for manufacturing the stamper on which a convex shape corresponding to a concave shape to be formed on a surface of the stamper contacting with the resin material, is formed;
    forming an anti-corrosion film made of an alloy selected from the group consisting of a silver alloy and a copper alloy on the surface of the metallic mold on which said convex shape is formed;
    laminating a metallic layer as a metallic main body on said anti-corrosion film by means of an electroplating method; and
    subsequently separating both said metallic main body laminated on the anti-corrosion film together with the anti-corrosion film from the metallic mold at the same time; wherein copper or silver is the main component in both the metallic main body and the anti-corrosion film.

2. A method for manufacturing a stamper used in an injection molding of a substrate out of a resin material, said method comprises steps of:
    providing a metallic mold for manufacturing the stamper on which a concave shape corresponding to a convex shape to be formed on a surface of the stamper contacting with the resin material, is formed;
    forming an anti-corrosion film made of an alloy selected from the group consisting of a silver alloy and a copper alloy on the surface of the metallic mold on which said concave shape is formed;
    laminating a metallic layer as a metallic main body on said anti-corrosion film by means of an electroplating method; and
    subsequently separating both said metallic main body laminated on the anti-corrosion film and the anti-corrosion film from the metallic mold at the same time; wherein copper or silver is the main component in both the metallic main body and the anti-corrosion film.

3. A stamper used for injection molding method of manufacturing a substrate made of a resin material, comprising:
    a metallic main body; and
    an anti-corrosion film comprising any one of alloy selected from the group consisting of a silver alloy and a copper alloy, wherein the anti-corrosion film is formed on the surface of the metallic main body to come in contact with the resin material, whereby preventing corrosion of the metallic main body,
    wherein copper or silver is the main component in both the metallic main body and the anti-corrosion film.

* * * * *